United States Patent
You et al.

(10) Patent No.: US 12,185,377 B2
(45) Date of Patent: Dec. 31, 2024

(54) HANDOVER PROCESSING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Xin You, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 352 days.

(21) Appl. No.: 17/479,759

(22) Filed: Sep. 20, 2021

(65) Prior Publication Data

US 2022/0007249 A1 Jan. 6, 2022

Related U.S. Application Data

(63) Continuation of application No. PCT/CN2019/079358, filed on Mar. 22, 2019.

(51) Int. Cl.
*H04W 74/0833* (2024.01)
*H04W 36/00* (2009.01)
*H04W 76/30* (2018.01)

(52) U.S. Cl.
CPC ....... *H04W 74/0833* (2013.01); *H04W 76/30* (2018.02); *H04W 36/0069* (2018.08)

(58) Field of Classification Search
CPC ........... H04W 36/08; H04W 36/00837; H04W 76/10; H04W 36/0077; H04W 36/0072;
(Continued)

(56) References Cited

U.S. PATENT DOCUMENTS

| 10,292,081 B2 | 5/2019 | Lee et al. |
| 2012/0218973 A1 | 8/2012 | Du |
| (Continued) | | |

FOREIGN PATENT DOCUMENTS

| CN | 102123457 A | 7/2011 |
| CN | 103889009 A | 6/2014 |
| (Continued) | | |

OTHER PUBLICATIONS

Second Office Action of the European application No. 19922101.1, issued on Jul. 12, 2023, 8 pages.
(Continued)

*Primary Examiner* — Kashif Siddiqui
(74) *Attorney, Agent, or Firm* — PERKINS COIE LLP

(57) ABSTRACT

The present invention discloses a handover processing method, a terminal device and a network device. The method comprises: receiving a handover instruction; executing a handover on the basis of the handover instruction, during the handover execution, interacting with a target network device through a signaling radio bearer (SRB) and/or a data radio bearer (DRB) with the target network device; after receiving the handover instruction, the method further comprises: determining whether to release the SRB with a source network device on the basis of an SRB release condition; and/or, determining whether to release the DRB with the source network device on the basis of the DRB release condition.

7 Claims, 6 Drawing Sheets

(58) Field of Classification Search
CPC . H04W 36/0011; H04W 76/27; H04W 36/18; H04W 76/30; H04W 74/0833
See application file for complete search history.

(56) References Cited

U.S. PATENT DOCUMENTS

| | | | | |
|---|---|---|---|---|
| 2016/0142951 | A1* | 5/2016 | Balasubramanian | ........................ H04W 36/0033 370/331 |
| 2017/0006513 | A1* | 1/2017 | Lee | ........................ H04W 36/14 |
| 2018/0084539 | A1* | 3/2018 | Kubota | ................. H04W 72/51 |
| 2018/0227819 | A1 | 8/2018 | Lee et al. | |
| 2019/0053175 | A1* | 2/2019 | Kubota | ................. H04W 16/14 |
| 2021/0022198 | A1* | 1/2021 | Wang | ................. H04W 36/1443 |
| 2022/0117027 | A1* | 4/2022 | Martinez Tarradell | ........................ H04W 76/27 |

FOREIGN PATENT DOCUMENTS

| | | | | |
|---|---|---|---|---|
| CN | 107371208 | A | * 11/2017 | ........ H04W 36/0016 |
| CN | 108702673 | A | 10/2018 | |
| CN | 109429285 | A | 3/2019 | |
| CN | 109543745 | A | 3/2019 | |
| WO | 2017138977 | A1 | 8/2017 | |

OTHER PUBLICATIONS

First Office Action of the Chinese application No. 202210245343.9, issued on Feb. 22, 2023. 29 pages with English translation.

3GPP "Technical Specification Group Radio Access Network; Evolved Universal Terrestrial Radio Access (E-UTRA); Radio Resource Control (RRC); Protocol specification (Release 15)", 3GPP Draft; 36331-F40, Feb. 19, 2019, XP051686908. 475 pages.

3GPP "TSG RAN; Evolved Universal Terrestrial Radio Access (E-UTRA) and Evolved Universal Terrestrial Radio Access Network (E-UTRAN); Overall description; Stage 2 (Release 15)", 3GPP TS 36.300, No. V15.4.0, Jan. 15, 2019, XP051591732. 363 pages.

Ericsson: "0 ms interruption support during handover procedure in NR", 3GPP Draft; R2-1801019, vol. RAN WG2, No. Vancouver, Canada; Jan. 22, 2018-Jan. 26, 2018, XP051386519. 8 pages.

Nokia et al. "Report from [104#61][LTE/feMOB] Solution directions for minimizing user data interruption for UL/DL (Nokia)", 3GPP Draft; R2-1900619, vol. RAN WG2, No. Athens, Greece; Feb. 25, 2019-Mar. 1, 2019, XP051597319. 49 pages.

Qualcomm Incorporated: "LTE mobility enhancements for MBB handover", 3GPP Draft; R2-1900791, 3GPP, vol. RAN WG2, No. Athens, Greece; Feb. 25, 2019-May 1, 2019, XP051602166. 9 pages.

Supplementary European Search Report in the European application No. 19922101.1, mailed on Mar. 2, 2022. 22 pages.

Written Opinion of the International Search Authority in the international application No. PCT/CN2019/079358, mailed on Dec. 2, 2019. 9 pages with English translation.

International Search Report in the international application No. PCT/CN2019/079358, mailed on Dec. 2, 2019.

Session chair (Nokia), "Report from break-out session on Rel-16 NR Industrial IoT SID and Rel-16 LTE even further mobility enhancements WID", 3GPP TSG-RAN WG2 Meeting #104 R2-1818528 Chengdu, China, Oct. 8-12, 2018.

* cited by examiner

HANDOVER PROCESSING METHOD, TERMINAL DEVICE AND NETWORK DEVICE

CROSS-REFERENCE TO RELATED APPLICATION

The present application is a continuation of International Application No. PCT/CN2019/079358 filed on Mar. 22, 2019, the disclosure of which is hereby incorporated by reference in its entirety.

TECHNICAL FIELD

The present disclosure relates to the technical field of information processing, and particularly to a handover processing method, a terminal device and a network device.

BACKGROUND

Procedures of a handover processing mainly include the following operations. A source base station transmits, based on a report result of a terminal device, a handover request to a target base station. After the target base station agrees to the handover request, the target base station configures the related information for the terminal device. Further, the source base station forwards mobility control information (mobilityControlInformation) to the terminal device, and the terminal device initiates a random access procedure to the target base station. When the terminal device successfully accesses the target base station (i.e., random access succeeds), a path switch is performed and the handover is finally completed.

However, a certain interruption time may exist in the above-mentioned procedures of a handover processing, so that service continuity cannot be ensured.

SUMMARY

To solve the above technical problem, an embodiment of the present disclosure provides a handover processing method, a terminal device, a network device, a computer storage medium, a chip, a computer readable storage medium, a computer program product, and computer programs.

According to a first aspect, there is provided a handover processing method, applied to a terminal device, the method including the following operations.

A handover command is received.

A handover is performed based on the handover command, during performing the handover, interaction with a target network device being performed through at least one of a signaling radio bearer (SRB) or a data radio bearer (DRB) between the terminal device and the target network device.

The method further includes the following operations. After receiving the handover command, performing at least one of:

determining whether to release an SRB between the terminal device and a source network device based on an SRB release condition; or determining whether to release a DRB between the terminal device and a source network device based on a DRB release condition.

According to a second aspect, there is provided a terminal device, including a processor, a memory for storing computer programs and a transceiver. The transceiver is configured to receive a handover command. The processor is configured to execute the computer programs to perform, based on the handover command, a handover, during performing the handover, interaction with a target network device being performed based on the transceiver through at least one of a signaling radio bearer (SRB) or a data radio bearer (DRB) between the terminal device and the target network device. The processor is further configured to execute the computer programs to perform at least one of: determining whether to release an SRB between the terminal device and a source network device based on an SRB release condition; or determining whether to release a DRB between the terminal device and a source network device based on a DRB release condition.

In a third aspect, a network device is provided including a processor, a memory for storing computer programs; and a transceiver. The processor is configured to execute the computer programs to interact with a terminal device through at least one of a data radio bearer (DRB) between the target network device and the terminal device or a signaling radio bearer (SRB) between the target network device and the terminal device via the transceiver.

DETAILED DESCRIPTION

In order to have a more detailed understanding of the characteristics and technical content of the embodiment of the present disclosure, the implementation of the embodiment of the present disclosure is described in detail in combination with the accompany drawings below. The accompany drawings are only for reference and not for limiting the embodiment of the present disclosure.

The technical solutions in the embodiments of the disclosure will be described below in conjunction with the drawings in the embodiments of the disclosure. Obviously, the described embodiments are a part of the embodiments of the disclosure, not all of the embodiments. Based on the embodiments in the disclosure, all other embodiments obtained by those of ordinary skilled in the art without creative work shall fall within the protection scope of the disclosure.

The technical solutions of the embodiments of the disclosure may be applied to various communication systems, such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system or a 5G system, etc.

Figure 1:
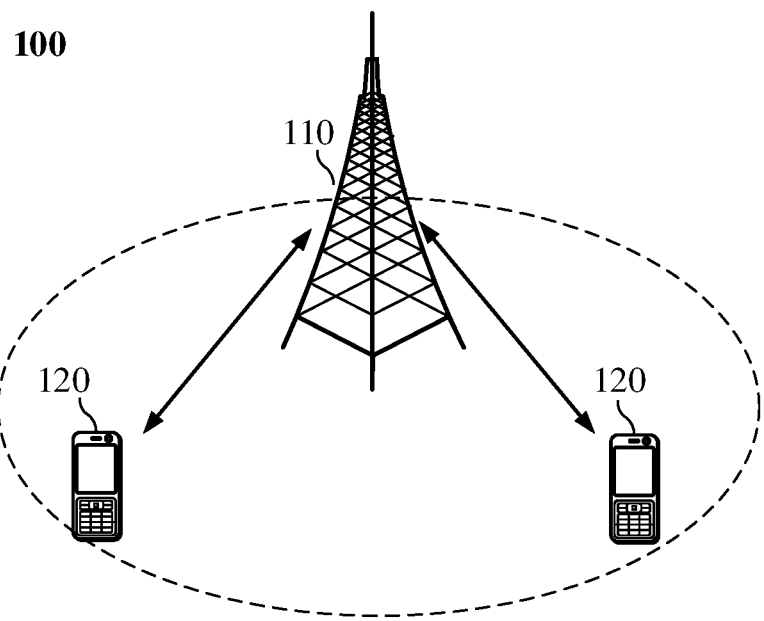
FIG. 1 is a first schematic diagram of a communication system architecture according to an embodiment of the present disclosure.

Exemplarily, the communication system 100 to which the embodiment of the present disclosure is applied is illustrated in FIG. 1. The communication system 100 may include a network device 110, herein the network device 110 may be a device that communicates with a terminal 120 (or called a communication terminal or terminal). The network device 110 may provide communication coverage for a specific geographic area, and may communicate with terminals located within the coverage area. In an embodiment, the network device 110 may be a Base Transceiver Station (BTS) in a GSM system or a CDMA system, or a NodeB (NB) in a WCDMA system, an Evolutional Node B (eNB or eNodeB) in an LTE system, or a wireless controller in the Cloud Radio Access Network (CRAN), or the network device may be a mobile switching center, a relay station, an access point, an in-vehicle device, a wearable device, a hub, a switch, a bridge, a router, a network-side device in 5G networks or a network device in the future enhanced Public Land Mobile Network (PLMN), etc.

The communication system 100 further includes at least one terminal 120 located within the coverage of the network device 110. "Terminal" as used herein includes but is not limited to an apparatus that is configured to receive or send communication signals via wired line connections, such as via Public Switched Telephone Networks (PSTN), Digital Subscriber Lines (DSL), digital cables, direct cable connections and/or another data connections/networks; and/or via wireless interfaces, such as wireless interfaces configured for cellular networks, wireless local area networks (WLAN), like digital TV network of DVB-H networks, satellite networks, AM-FM broadcast transmitters and/or another terminal and/or Internet of Things (IoT) device. A terminal set to communicate via a wireless interface may be referred to as a "wireless communication terminal", a "wireless terminal" or a "mobile terminal". Examples of mobile terminals include but are not limited to satellites or cellular phones; Personal Communications System (PCS) terminals that can combine cellular radio phones with data processing, fax, and data communication capabilities; PDA that includes radio phones, pagers, Internet/intranet access, Web browser, memo pad, calendar, and/or Global Positioning System (GPS) receiver; and conventional laptop and/or palmtop receivers or other electronic apparatuses including radio telephone transceivers. The terminal may refer to access terminals, user equipment (UE), user units, user stations, mobile stations, mobile platforms, remote stations, remote terminals, mobile device, user terminals, terminals, wireless communication device, user agents or user apparatuses. The access terminal may be cellular phones, cordless phones, Session Initiation Protocol (SIP) phones, Wireless Local Loop (WLL) stations, personal digital assistants (PDA), handheld devices with wireless communication functions, computing devices or other processing devices connected to wireless modems, in-vehicle devices, wearable devices, terminals in 5G networks, or terminals in the future enhanced PLMN, etc.

In an embodiment, a communication mode of Device to Device (D2D) may be performed between the terminals 120.

In an embodiment, the 5G system or the 5G network may also be referred to as a New Radio (NR) system or an NR network.

It should be understood that the terms "system" and "network" herein are often used interchangeably. The term "and/or" herein is only an association relationship describing associated objects, which means that there may be three relationships. For example "A and/or B" may have three meanings: A exists alone, A and B exist at the same time and B exists alone. In addition, the character "/" herein generally indicates that the associated objects before and after the character "/" are in an "or" relationship.

In order that the features and technical contents of the embodiments of the present disclosure may be more fully understood, an implementation of the embodiments of the present disclosure will be described in detail with reference to the accompanying drawings, which are provided for purposes of illustration only and are not intended to limit the embodiments of the present disclosure.

Figure 2A:
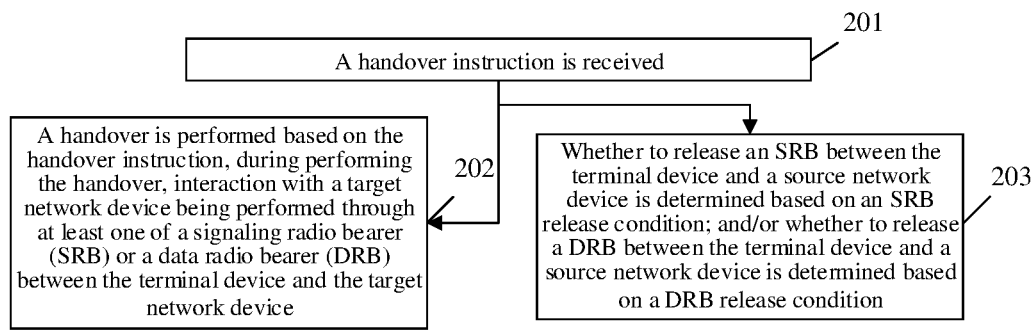
FIG. 2A is a first schematic flowchart of a handover processing method according to an embodiment of the present disclosure.

An embodiment of the present disclosure provides a handover processing method applied to a terminal device, as illustrated in FIG. 2A, including the following operations.

In operation 201, a handover command is received.

In operation 202, a handover is performed based on the handover command, during performing the handover, interaction with a target network device being performed through at least one of a signaling radio bearer (SRB) or a data radio bearer (DRB) between the terminal device and the target network device.

The method further includes the following operations. After receiving the handover command, at least one of the following is performed.

In operation 203, whether to release an SRB between the terminal device and a source network device is determined based on an SRB release condition; or whether to release a DRB between the terminal device and a source network device is determined based on a DRB release condition.

It should be noted that a sequence of execution of the foregoing operation 202 and the operation 203 is not limited. The operation 202 and the operation 203 may be performed at the same time. Alternatively, the operation 202 may be performed first and then the operation 203 may be performed, or the operation 203 may be performed first and then the operation 202 may be performed. This embodiment is not exhaustive.

When performing the operation 203, it may be that during performing the handover, the terminal device performs at least one of: determining whether to release an SRB between the terminal device and a source network device based on an SRB release condition; or determining whether to release a DRB between the terminal device and a source network device based on a DRB release condition.

Figure 3A:
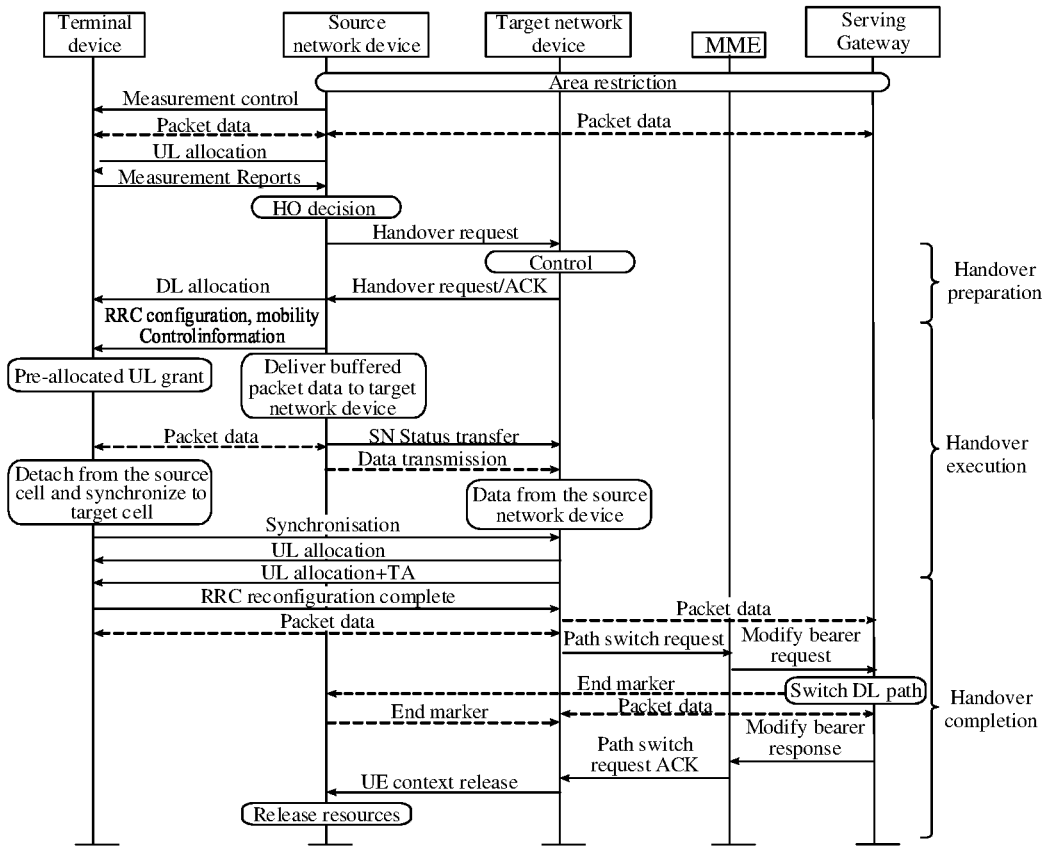
FIG. 3A is a first schematic flowchart of a handover processing.

In this embodiment, the procedure of the handover processing will be described with reference to FIG. 3A.

Handover preparation includes the following operations. A source network device configures a terminal device to perform measurement reporting and transmits a handover request to a target network device based on the reporting result of the terminal device. After the target network device agrees to the handover request, a radio resource control (RRC) message mobilityControlInformation is configured for the terminal device. The RRC message mobilityControlInformation includes a random access channel (RACH) resource, a cell-radio network temporary identifier (C-RNTI), a target network device security algorithm, system messages of a target network device, and the like.

Handover execution includes the following operations. The source network device forwards the mobilityControlInformation to the terminal device. After receiving the handover command, the terminal device initiates a random access to the target network device. At the same time, the source network device transmits a sequence number status transfer (SN STATUS TRANSFER) to the target network device for informing the target network device of an uplink packet data convergence protocol (PDCP) sequence number reception state and a downlink PDCP sequence number transmission state.

Handover completion includes the following operations. After the terminal device successfully accesses the target network device (random access succeeds), the target network device transmits a PATH SWITCH REQUEST to request a mobility management entity (MME) to switch a downlink path. After the path switch is completed, the target network device instructs the source network device to release the terminal device context, and the handover is completed.

Figure 3B:
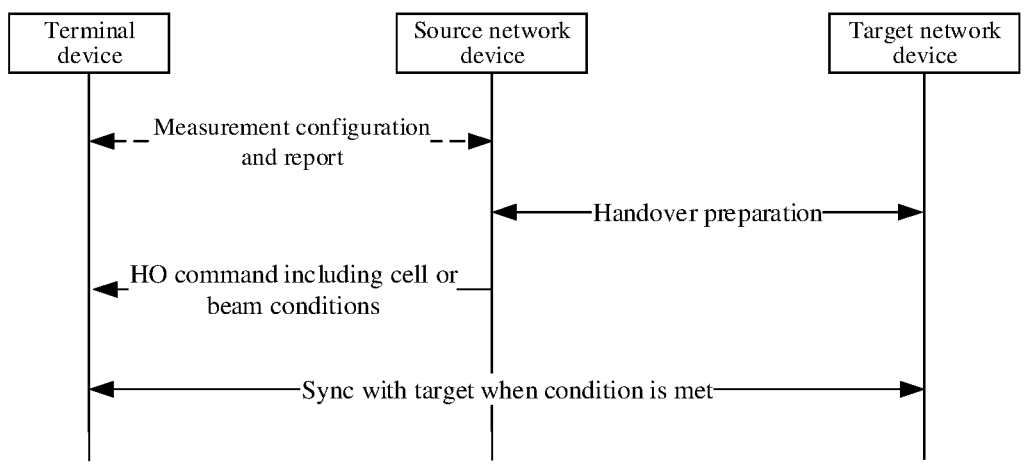
FIG. 3B is a second schematic flowchart of a handover processing.

For a special scenario, as illustrated in FIG. 3B, for example, in a high-speed moving or high-frequency condition of the UE, frequent handover is required. Conditional handover avoids the problem that it is late when the UE performs a handover because time for the handover preparation is too long, and configures handover command (HO command) for the terminal device in advance. On the other hand, for the high-speed railway scenario, the moving trajectory of the terminal device is specific, so that the network device may allocate the target network device to the UE in advance, and includes a condition for triggering the terminal device to perform a handover in the HO command, and when the configured condition is satisfied, the terminal device initiates an access request to the target network device.

Based on the above scenario description, the following describes in detail the solution provided in the present embodiment, and it is to be understood that the present embodiment can be applied to Enhanced Mobile Broadband (eMBB), and of course can be applied to other scenarios, except that the present embodiment is not exhaustive.

The SRB release condition includes at least one of:
in response to transmission of a signaling MSG1, releasing the SRB between the terminal device and the source network device;
in response to receipt of a random access response (RAR), releasing the SRB between the terminal device and the source network device;
in response to transmission of an MSG3 being completed, releasing the SRB between the terminal device and the source network device;
in response to the handover being completed, releasing the SRB between the terminal device and the source network device; or
in response to receipt of an MSG4, releasing the SRB between the terminal device and the source network device.

The MSG1, the RAR, the MSG3, and the MSG4 are understood to be information transmitted and received at the time of initiating a random access, and the RAR is an MSG2. The MSG1 refers to an open-loop power control process in which a terminal device gradually boosts a power to transmit probe. The RAR, that is, the MSG2, refers to an ACK returned by the network device side according to the received MSG1 at a certain moment. The MSG3 refers to an RRC setup request or a re-establishment request transmitted by a terminal device. The MSG4 refers to an RRC setup or re-establishment command transmitted by the network device on the network side to the terminal device.

Specifically, the SRB release conditions are described as follows.

The SRB of the source network device may be released when the terminal device transmits the MSG1. Alternatively, the SRB of the source network device may be released when a first preset period of time after the terminal device transmits the MSG1 is reached. The first preset period of time is set according to the actual situation.

Alternatively, the SRB of the source network device may be released when the terminal device receives the RAR. That is, the SRB of the source network device is released when the terminal device receives the MSG2. Alternatively, the SRB between the source network device and the terminal device is released when a second preset period of time after the terminal device receives the MSG2 is reached. The second preset period of time is set according to the actual situation.

For Contention Free Random Access (CFRA), the terminal device receiving the RAR represents accessing the target network device successfully. For Contention Based Random Access (CBRA), the terminal device receiving the RAR only represents receiving the MSG2 successfully.

The SRB for the source network device may be released after the MSG3 is transmitted. For example, for the CFRA and the CBRA, the terminal device transmits RRC reconfiguration completion messages. Alternatively, the SRB of the source network device may be released when a third preset period of time after the MSG3 is transmitted is reached. The third preset period of time is set according to the actual situation.

The SRB for the source network device is released when the handover is completed.

The SRB for the source network device is released after switching to the target network device.

It should be noted that a moment when the handover is completed may be interpreted as a moment when it is determined that the handover is successful, for example, a moment when it is confirmed that a connection is established with the target network device.

A moment after switching to the target network device can be interpreted as a moment when a period of time after it is determined that the handover is successful is reached. For example, a timer may be started at a moment when it is determined that the handover is completed, and a moment when the timer stops or reaches a preset period of time may be used as the moment after the handover is completed.

The SRB may be released when the MSG4 is received, or the SRB may be released when a fourth preset period of time after the MSG4 is received is reached. The fourth preset period of time is set according to actual conditions.

In addition, the DRB release condition includes at least one of:
- in response to transmission of an MSG1, releasing the DRB between the terminal device and the source network device;
- in response to receipt of a random access response (RAR), releasing the DRB between the terminal device and the source network device;
- in response to transmission of an MSG3 being completed, releasing the DRB between the terminal device and the source network device;
- in response to the handover being completed, releasing the DRB between the terminal device and the source network device; or
- in response to receipt of an MSG4, releasing the DRB between the terminal device and the source network device.

Similar to the foregoing SRB release conditions, the DRB release condition includes at least one of the followings.

The DRB for the source network device may be released when the terminal device transmits the MSG1. Alternatively, the DRB for the source network device may be released when a first preset period of time after the terminal device transmits the MSG1 is reached. The first preset period of time is set according to the actual situation.

Alternatively, the DRB for the source network device may be released when the terminal device receives the RAR. That is, the DRB for the source network device is released when the terminal device receives the MSG2. Alternatively, the DRB between the source network device and the terminal device may be released when a second preset period of time after the terminal device receives the MSG2 is reached. The second preset period of time is set according to the actual situation.

For Contention Free Random Access (CFRA), the terminal device receiving the RAR represents accessing the target network device successfully. For Contention Based Random Access (CBRA), the terminal device receiving the RAR only represents receiving the MSG2 successfully.

The DRB for the source network device may be released after the MSG3 is transmitted. For example, for the CFRA and the CBRA, the terminal device transmits RRC reconfiguration completion messages. Alternatively, the DRB for the source network device may be released when a third preset period of time after the MSG3 is transmitted is reached. The third preset period of time is set according to the actual situation.

The DRB for the source network device is released when the handover is completed.

The DRB for the source network device is released after switching to the target network device.

It should be noted that a moment when the handover is completed may be interpreted as a moment when it is determined that the handover is successful, for example, a moment when it is confirmed that a connection is established with the target network device.

After switching to the target network device can be interpreted as a moment when a period of time after it is determined that the handover is successful is reached. For example, a timer may be started at a moment when it is determined that the handover is completed, and a moment when the timer stops or reaches a preset period of time may be used as the moment after the handover is completed.

The DRB is released when the MSG4 is received, or the DRB is released when a fourth preset period of time after the MSG4 is received is reached. The fourth preset period of time is set according to actual conditions.

It should be noted that the handover command includes configuration information.

The configuration information includes at least one of an SRB release condition or a DRB release condition configured by the network side for the terminal device.

The SRB release condition and the DRB release condition included in the handover command may be at least one of: at least part of the above-described SRB release conditions, that is, one or more of the SRB release conditions, or at least part of the DRB release conditions, that is, one or more of the DRB release conditions.

Further, the SRB release condition and the DRB release condition included in the configuration information in the handover command may be different. For example, the SRB release condition is releasing the SRB between the terminal device and the source network device in response to transmission of an MSG1, and the DRB release condition is releasing the DRB between the terminal device and the source network device in response to the handover being completed.

In other words, the time for releasing the SRB and the DRB between the terminal device and the source network device may be different, and of course, may be the same. For example, the SRB and the DRB are both released at the completion of the handover. The time for releasing the SRB and the DRB between the terminal device and the source network device may be configured according to the actual situation, and the present embodiment will not be exhaustive.

The condition for performing at least one of establishing the SRB between the terminal device and the target network device or activating the SRB between the terminal device and the target network device, and the condition for performing at least one of establishing the DRB between the terminal device and the target network device or activating the DRB between the terminal device and the target network device will be described as follows.

The method further includes at least one of:
- in response to receipt of the handover command, performing at least one of establishing the SRB between the terminal device and the target network device or activating the SRB between the terminal device and the target network device;
- in response to receipt of a random access response (RAR), performing at least one of establishing the SRB between the terminal device and the target network device or activating the SRB between the terminal device and the target network device; or
- in response to transmission of an MSG3, performing at least one of establishing the SRB between the terminal device and the target network device or activating the SRB between the terminal device and the target network device.

The receipt of the handover command may be a moment when the handover command is received, or a period of time after the handover command is received. The receipt of the RAR may be a moment when the RAR is received, or a period of time after the RAR is received. The transmission of the MSG3 may be a moment when the MSG3 is transmitted, or a period of time after the MSG3 is transmitted, or a period of time before the MSG3 is transmitted. The period of time before the MSG3 is transmitted and the period of time after the MSG3 is transmitted may be the same or different, which is set according to actual conditions.

The difference between establishing an SRB and activating an SRB can be understood as follows. Establishing an SRB means that an SRB has been configured for a terminal device by a network, and the terminal device has configured/ established the SRB according to network configuration information, but the SRB has not been activated at this time. Activating the SRB means that the SRB has been established and has been used for signaling interaction between the terminal and the network, i.e. activated. In addition, the differences between establishing a DRB and activating a DRB are similar to those of the SRB, which will not be described later.

For example, the timing or condition for establishing the SRB may be interpreted as establishing the SRB for the target network device upon receipt of the handover command (HO command), or establishing the SRB after the RAR is received.

The timing or condition for activating the SRB may be interpreted as activating the SRB when the terminal device transmits the MSG3, or activating the SRB after the RAR is received.

Of course, the foregoing case is merely an example, and the timing or the condition for establishment and activation may be the same in practice. For example, both the SRB and the DRB for the target network device are established upon receipt of the handover command (HO command) This embodiment will not be exhaustive.

The method further includes at least one of:
in response to receipt of the handover command, performing at least one of establishing the DRB between the terminal device and the target network device or activating the DRB between the terminal device and the target network device;
in response to transmission of an MSG1, performing at least one of establishing the DRB between the terminal device and the target network device or activating the DRB between the terminal device and the target network device;
in response to receipt of an MSG2, performing at least one of establishing the DRB between the terminal device and the target network device or activating the DRB between the terminal device and the target network device;
in response to transmission of an MSG3, performing at least one of establishing the DRB between the terminal device and the target network device or activating the DRB between the terminal device and the target network device;
in response to receipt of an MSG4, performing at least one of establishing the DRB between the terminal device and the target network device or activating the DRB between the terminal device and the target network device; or
in response to receipt of a physical downlink control channel (PDCCH), performing at least one of establishing the DRB between the terminal device and the target network device or activating the DRB between the terminal device and the target network device.

The receipt of the handover command may be a moment when the handover command is received, or a period of time after the handover command is received. The transmission of the MSG1 may be a moment when the MSG1 is transmitted, or a period of time after the MSG1 is transmitted, or a period of time before the MSG1 is transmitted. The period of time before the MSG1 is transmitted and the period of time after the MSG1 is transmitted may be the same or different, which is set according to actual conditions. The receipt of the MSG2 may be a moment when the RAR is received, or a period of time after the RAR is received. The transmission of the MSG3 may be a moment when the MSG3 is transmitted, or a period of time after the MSG3 is transmitted, or a period of time before the MSG3 is transmitted. The period of time before the MSG3 is transmitted and the period of time after the MSG3 is transmitted may be the same or different, which is set according to actual conditions.

For example, the DRB establishing condition is establishing the DRB for the target network device upon receipt of the handover command (HO command).

The timing or condition for activating a DRB is one of the following.

Upon transmission of the MSG1, upon receipt of the MSG2, upon transmission of the MSG3, upon receipt of the MSG4; or upon receipt of the PDCCH.

Similarly, the timing or condition for establishing and activating a DRB may be the same or different, which will not be exhaustive here.

It will also be appreciated that the DRB and the SRB between the terminal device and the target network device may be established or activated at different times, or may be established or activated at the same time.

Based on the foregoing solution, the present embodiment further describes in detail how to perform data transmission.

The method further includes one of the followings.

When both the DRB between the terminal device and the source network device and the DRB between the terminal device and the target network device are activated, data transmission is performed through the DRB between the terminal device and the source network device and the DRB between the terminal device and the target network device. That is, in a case that both the DRB for the source network device and the DRB for the target network device exist, data interaction with the network device side can be performed through both the DRB for the source network device and the DRB for the target network device. In this case, the SRB between the terminal device and the source network device may be in an active state or may has been released; and similarly, the SRB between the terminal device and the target network device may be in an active state or in a released state, which does not affect the interaction with the network device side through the DRB.

When both the SRB between the terminal device and the source network device and the SRB between the terminal device and the target network device are activated, data transmission is performed through the SRB between the terminal device and the source network device and the SRB between the terminal device and the target network device. That is, in a case that both the SRB for the source network device and the SRB for the target network device exist, signaling interaction with the network device side is performed through both the SRB for the source network device and the SRB for the target network device. In this case, the DRB between the terminal device and the source network device may be in an active state or may have been released; and similarly, the DRB between the terminal device and the target network device may be in an active state or in a released state, which does not affect the signaling interaction with the network device side through the SRB.

When both the DRB between the terminal device and the source network device and the SRB between the terminal device and the target network device are activated, data transmission is performed through the DRB between the terminal device and the source network device and the SRB between the terminal device and the target network device. That is, data interaction is performed with the source network device side through the DRB, and signaling interaction is performed with the target network device through the SRB between the terminal device and the target network device.

When both the SRB between the terminal device and the source network device and the DRB between the terminal device and the target network device are activated, data transmission is performed through the SRB between the terminal device and the source network device and the DRB between the terminal device and the target network device. That is, signaling interaction with the source network device side is performed through the SRB, and data interaction with the target network device side is performed through the DRB between the terminal device and the target network device.

The method further includes at least one of:
when the DRB between the terminal device and the source network device is released and the DRB between the terminal device and the target network device is in an active state, performing data transmission with the target network device through the DRB;
when the DRB between the terminal device and the source network device is in an active state and the DRB between the terminal device and the target network device is not activated, performing data transmission with the source network device through the DRB;
when the SRB between the terminal device and the source network device is released and the SRB between the terminal device and the target network device is in an active state, performing signaling interaction with the target network device through the SRB; or
when the SRB between the terminal device and the source network device is in an active state and the SRB between the terminal device and the target network device is not activated, performing signaling interaction with the source network device through the SRB.

It should be noted that the foregoing several cases may exist separately or simultaneously. For example, in a case that the SRB for the source network device is in an active state, the SRB for the target network device is not activated, but the DRB for the source network device is released, and the DRB for the target network device is in an active state, signaling interaction is performed through the SRB between the terminal device and the source network device and the data transmission is performed through the DRB between the terminal device and the target network device. Of course, there may be other cases, which will not be exhaustive here. In general, data and/or signaling interaction is/are performed based on the currently activated SRB and/or DRB of the target network device side, and data and/or signaling interaction is/are performed based on the currently activated SRB and/or DRB for the source network device side.

It is also noted that the method further includes the following operations.

At least one of configured SRB between the terminal device and the target network device or configured DRB between the terminal device and the target network device is determined via the handover command or via a system message. That is, a bearer to be established may be issued by a handover command, or may be acquired in advance when a system message is received.

Further, regarding the network side, it is also necessary to acquire the capability information of the terminal device, and therefore, it is necessary for the terminal device to transmit the capability of the terminal device. The capability of the terminal device may include the capability information on whether the terminal device is capable of establishing the DRB and/or the SRB with the source network device and the target network device at the same time. Of course, other capabilities may be included, which will not be exhaustive in this embodiment. Accordingly, the network side may perform bearer configuration for the terminal device according to the capability information reported by the terminal device, the bearer configuration including at least one of an SRB configuration between the terminal device and the target network device or a DRB configuration between the terminal device and the target network device, and the like.

Figure 2B:
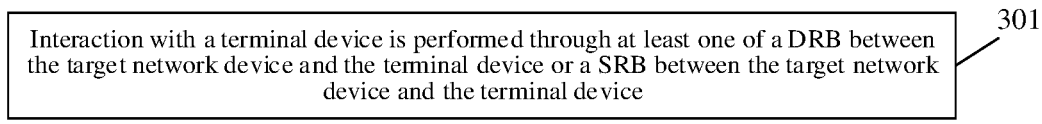
FIG. 2B is a second schematic flowchart of a handover processing method according to an embodiment of the present disclosure.

Referring to FIG. 2B, the processing on the target network device side includes an operation 301 of interacting with a terminal device through at least one of a data radio bearer (DRB) between the target network device and the terminal device or a signaling radio bearer (SRB) between the target network device and the terminal device.

That is, in the foregoing handover procedures, establishment and activation of at least one of the DRB or the SRB can be performed with the terminal device, and finally data and signaling interaction can be performed through at least one of the DRB or the SRB.

Specifically, the time for establishing and activating at least one of the DRB or the SRB between the target network device and the terminal device may be the same as those described above, which will not be repeated herein.

Accordingly, the target network device configures at least one of the SRB or the DRB for the terminal device. The target network device receives capability reported by the terminal device and determines at least one of the SRB or the DRB to be configured for the terminal device based on the received capability of the terminal device. The method performed by the target network device for transmitting at least one of the configured SRB or the DRB corresponds to the method performed at the terminal device side. That is, at least one of the SRB or the DRB is configured for the terminal device via a handover command or via a system message.

The processing on the source network device side includes forwarding a handover command for the terminal device. The handover command may include configuration information. The configuration information may include at least one of an SRB release condition or a DRB release condition configured by the network side for the terminal device. A specific release condition is described above, which will not be repeated herein.

In addition, the source network device retains at least one of data interaction or signaling interaction with the terminal device before the terminal device releases the at least one of the SRB or DRB between the terminal device and the source device.

The above-described solutions are described below in connection with examples. It should be understood that in the solution provided by the present embodiment, a network device is interpreted as a base station device on a network side. That is, a source network device may be a source base station, and a target network device may be a target base station.

In a first example, when performing a handover, only one SRB is established and the DRB between the terminal device and the source network device and the DRB between the terminal device and the target network device are established. Specifically, the terminal device establishes bearers (including the DRB and the SRB) between the terminal device and the target network device based on the configuration information of the mobility control information in the HO command upon receiving the HO command. Based on the configuration information in the HO command, the UE initiates a random access to the target network device, and bearer configurations (including establishment, activation and release) between the UE and the source network device and between the UE and the target network device during performing the handover are as illustrated in FIG. 4 and FIG. 5.

Figure 4:
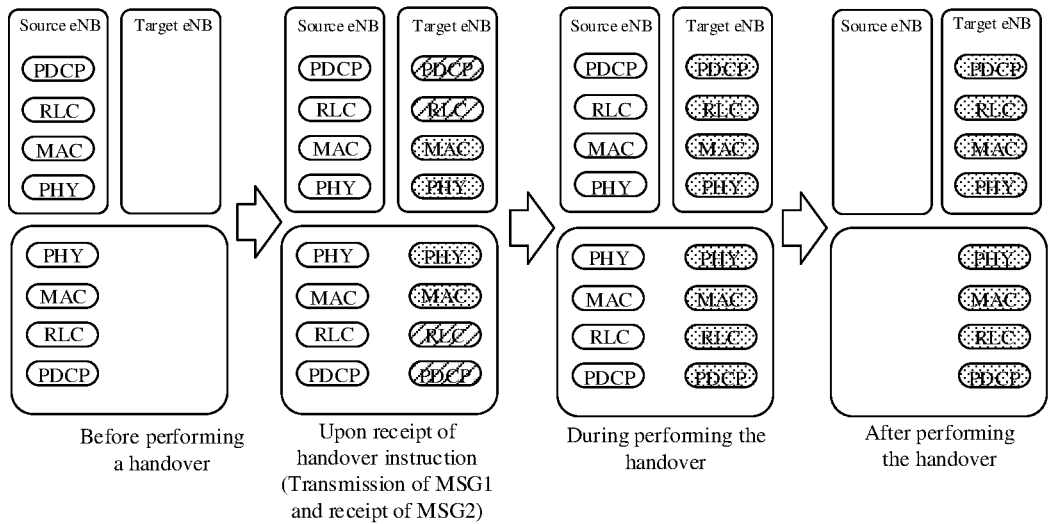
FIG. 4 is a first schematic diagram of a bearer establishing and releasing scenario in a handover processing according to an embodiment of the present disclosure.
Figure 5:
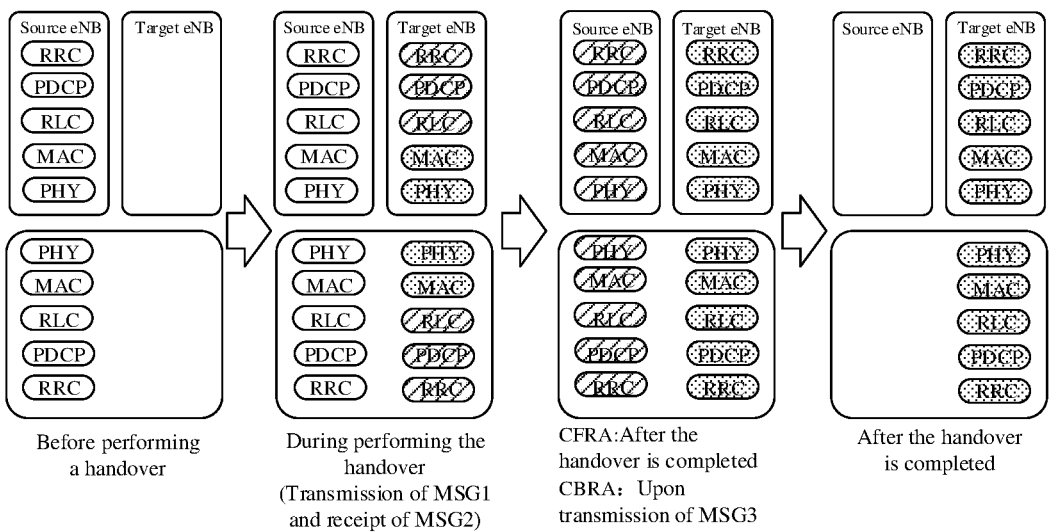
FIG. 5 is a second schematic diagram of a bearer establishing and releasing scenario in a handover processing according to an embodiment of the present disclosure.

Herein, the establishment and release of the DRB, the reference of which may be made to FIG. 4, includes the following operations.

1. Before performing the handover, the terminal device performs data interaction with the source network device through the DRB.

2. When the HO command is received, the terminal device establishes a DRB between the terminal device and the target network device.

3. During performing the handover, random access (transmission of an MSG1 and receipt of an MSG2) is performed using the MAC and PHY of the target network device.

4. From a time when the handover is completed (MSG4 received) to a time before the source network device is realeased, data transmission between the terminal device and the source network device and between the terminal device and the target network device can be performed at the same time. At this time, both the DRB for the source network device and the DRB for the target network device are retained.

5. After the handover is completed, the terminal device releases the connection with the source network device and only performs data transmission with the target network device.

The establishment and release of the SRB, reference of which may be made to FIG. 5, includes the following operations.

1. Before performing the handover, the terminal device performs signaling interaction with the source network device through the SRB.

2. When the HO command is received, the terminal device establishes an SRB between the terminal device and the target network device.

3. During performing the handover, random access (transmission of an MSG1 and receipt of an MSG2) is performed using the MAC and PHY of the target network device.

4. The handover completion message (MSG3) is transmitted, the terminal device performs signaling interaction with the target network device only through the SRB between the terminal device and the target network device, while the SRB between the terminal device and the source network device has been released at this time.

In a second example, when performing a handover, there are a single SRB and a single DRB. The terminal device establishes bearers (including the DRB and the SRB) between the terminal device and the target network device based on the configuration information of the mobility control information in the HO command upon receiving the HO command Based on the configuration information in the HO command, the UE initiates a random access to the target network device, and bearer configurations (including establishment, activation and release) between the terminal device and the source network device and between the terminal device and the target network device during performing the handover are as illustrated in FIG. 6 and FIG. 7.

Figure 6:
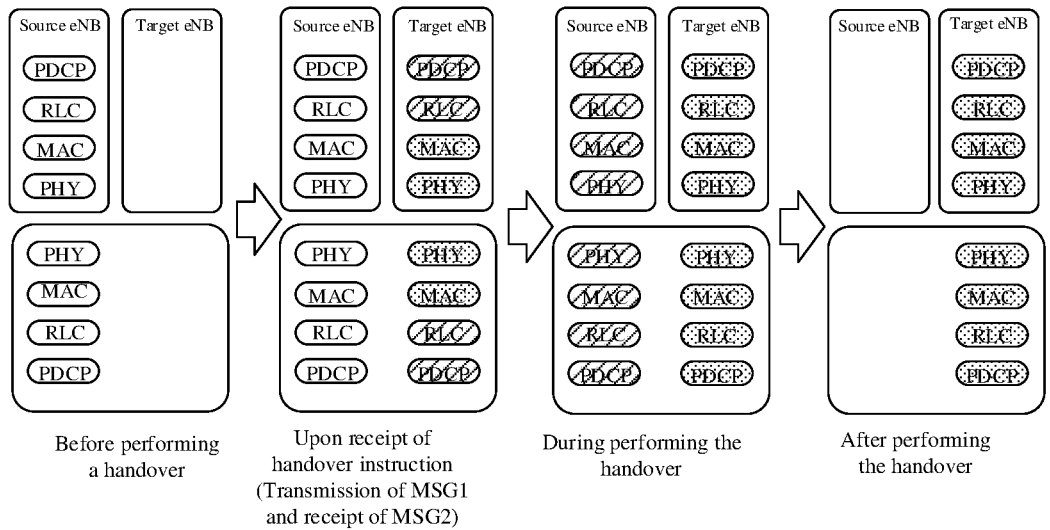
FIG. 6 is a third schematic diagram of a bearer establishing and releasing scenario in a handover processing according to an embodiment of the present disclosure.
Figure 7:
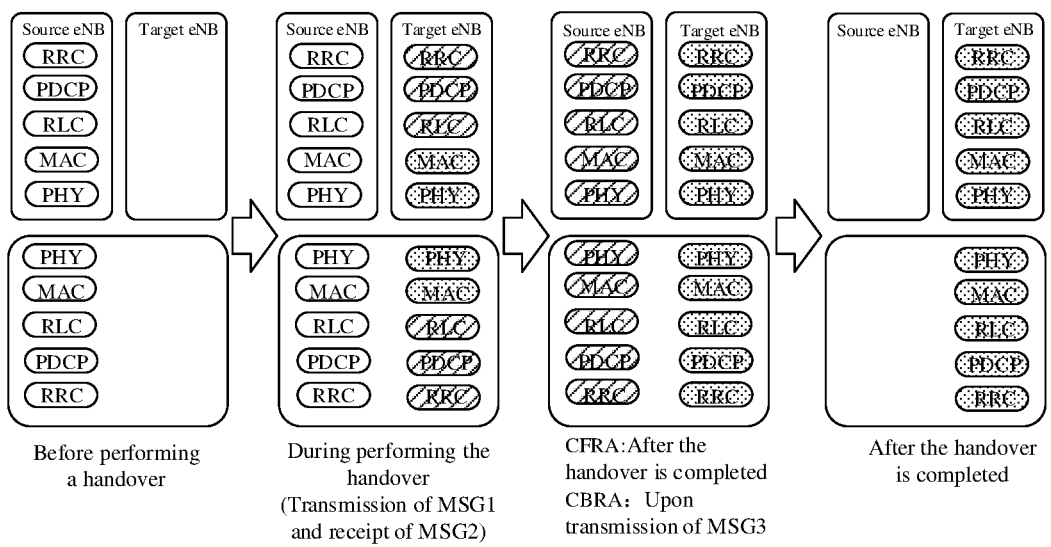
FIG. 7 is a fourth schematic diagram of a bearer establishing and releasing scenario in a handover processing according to an embodiment of the present disclosure.

For the DRB, as illustrated in FIG. 6, the following operations are included.

1. Before performing the handover, the terminal device performs data interaction with the source network device through the DRB.

2. When the HO command is received, the terminal device establishes a DRB between the terminal device and the target network device.

3. During performing the handover, random access (transmission of an MSG1 and receipt of an MSG2) is performed using the MAC and PHY of the target network device.

4. The handover completion (MSG3/MSG2 received) is transmitted, the terminal device releases the connection with the source network device and only performs data transmission with the target network device.

For the SRB, as illustrated in FIG. 7, the following operations are included.

1. Before performing the handover, the terminal device performs signaling interaction with the source network device through the SRB.

2. When the HO command is received, the terminal device establishes an SRB between the terminal device and the target network device.

3. During performing the handover, random access (transmission of an MSG1 and receipt of an MSG2) is performed using the MAC and PHY of the target network device.

4. The handover completion message is transmitted (MSG3/ after MSG2 received), the terminal device performs signaling interaction with the target network device only through the SRB between the terminal device and the target network device, while the SRB between the terminal device and the source network device has been released at this time.

In a third example, when performing a handover, there are dual SRB and dual DRB.

The terminal device establishes bearers (including the DRB and the SRB) between the terminal device and the target network device based on the configuration information of the mobility control information in the HO command upon receiving the HO command. Based on the configuration information in the HO command, the UE initiates a random access to the target network device, and bearer configurations (including establishment, activation and release) between the terminal device and the source network device and between the terminal device and the target network device during performing the handover are as illustrated in FIG. 8 and FIG. 9.

Figure 8:
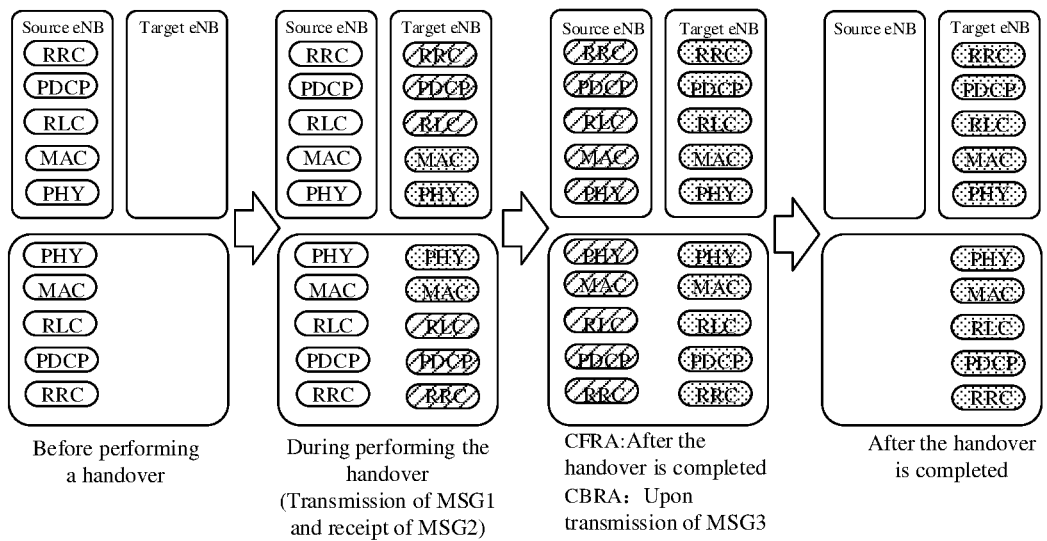
FIG. 8 is a fifth schematic diagram of a bearer establishing and releasing scenario in a handover processing according to an embodiment of the present disclosure.
Figure 9:
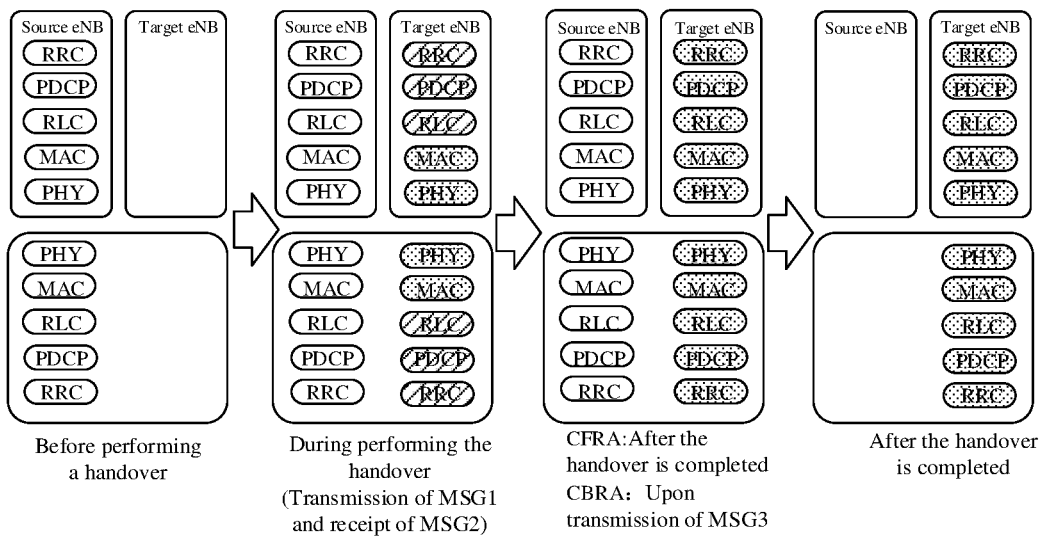
FIG. 9 is a sixth schematic diagram of bearer establishing and releasing scenario in a handover processing according to an embodiment of the present disclosure.

For the DRB, as illustrated in FIG. 8, the following operations are included.

1. Before performing the handover, the UE performs data interaction with the source network device through the DRB.

2. When the HO command is received, the UE establishes a DRB between the terminal device and the target network device.

3. During performing the handover, random access (transmission of an MSG1 and receipt of an MSG2) is performed using the MAC and PHY of the target network device.

4. From a time when the handover is completed (MSG3) to a time before the source network device is released, data transmission between the UE and the source network device and between the UE and the target network device can be performed at the same time.

5. After the handover is completed, the UE releases the connection with the source network device and only performs data transmission with the target network device.

For the SRB, as illustrated in FIG. 9, the following operations are included.

1. Before performing the handover, the UE performs signaling interaction with the source network device through the SRB.

2. When the HO command is received, the UE establishes an SRB between the UE and the target network device.

3. During performing the handover, random access (transmission of an MSG1 and receipt of an MSG2) is performed using the MAC and PHY of the target network device.

4. The handover completion message (MSG3), the SRB between the UE and the target network device is activated successfully, thus the UE performs signaling interaction with the target network device, and the UE is capable of performing signaling interaction with the source network device because the SRB between the UE and the source network device is not released.

5. After the handover is completed, the UE releases the SRB between the UE and the source network device.

In a fourth example, unlike the foregoing several examples, the present example is described with respect to a situation that the SRB and the DRB for the source network device are not released at the same time, which includes the following operations.

1. Before performing the handover, the UE performs signaling interaction with the source network device through the SRB, and performs data interaction with the source network device is performed through the DRB.

2. In response to receipt of the handover command HO command, an SRB between the UE and the target network device and a DRB between the UE and the target network device are established. At this time, a DRB between the UE and the source network device is released and an SRB between the UE and the source network device is retained.

3. During performing the handover, random access (transmission of MSG1 and receipt of an MSG2) is performed using the MAC and PHY of the target network device.

4. After the handover completion message (MSG3) is received, the SRB between the UE and the target network device is activated successfully, the UE performs signaling interaction with the target network device, and the UE also performs signaling interaction with the source network device because the SRB between the UE and the source network device is not released. After the handover is completed, the UE releases the SRB between the UE and the source network device.

It should be understood that the present example provides only an explanation of the timing for releasing the SRB and the DRB between the terminal device and the source network device. In fact, there may be more combinations of different timing for releasing the SRB and the DRB. Reference is made to the description of the foregoing SRB release condition and the DRB release condition in the present embodiment, which is no exhaustive herein.

A fifth example differs from the fourth example in that the present example describes a situation that the DRB and the SRB between the terminal device and a target network device are not established at the same time, which includes the following operations.

1. Before performing the handover, the UE performs data interaction with the source network device through the DRB and performs signaling interaction with the source network device through the SRB.

2. When the HO command is received, the UE establishes a DRB between the UE and the target network device, and at this time, retains the SRB and the DRB between the UE and the source network device, and performs signaling interaction and data interaction.

3. During performing the handover, random access (transmission of an MSG1 and receipt of an MSG2) is performed using the MAC and PHY of the target network device.

4. From a time when the handover is completed (MSG3) to a time before the source network device is released, data transmission between the UE and the source network device and between the UE and the target network device can be performed at the same time and an SRB between the UE and the target network device is established.

5. After the handover is completed, the UE releases the SRB and the DRB between the UE and the source network device and performs data transmission only through the SRB and the DRB between the UE and the target network device.

It should be noted that, in this example, only a combination of the timings for establishing the SRB and the DRB between the UE and the target network device is illustrated. In fact, there may be more situations which have been described respectively above and details are not described herein.

In a sixth example, the present example describes a situation that the SRB and the DRB between the UE and the source network device are released at the same time, and the SRB and the DRB between the UE and the target base station are established at the same time.

1. Before performing the handover, the UE performs data interaction with the source network device through the DRB and performs signaling interaction with the source network device through the SRB.

2. When the HO command is received, the UE establishes a DRB between the UE and the target network device and establishes a SRB between the UE and the target network device, and at this time, retains the SRB and the DRB between the UE and the source network device, and performs signaling interaction and data interaction.

3. During performing the handover, random access (transmission of an MSG1 and receipt of an MSG2) is performed using the MAC and PHY of the target network device. At this time, the SRB and the DRB between the UE and the source network device are released.

4. After the handover is completed (MSG3), the UE performs data transmission only through the SRB and the DRB between the UE and the target network device.

It should be understood that, in practice, there may be a combination of more situations. For example, the SRB between the UE and the target base station and the DRB between the UE and the target base station are established at different times, and the SRB between the UE and the source base station and the DRB between the UE and the source base station are related at different times, except that the present embodiment will not be exhaustive.

It can be seen that by adopting the above-described solution, during performing a handover it is possible to for the terminal device to determine, according to the release condition, whether to release the SRB and/or the DRB established between the terminal device and the source network device, and at the same time, perform interaction through the SRB and/or the DRB between the terminal device and the target network device, so that the complexity of the terminal device is reduced to the maximum extent while the reduction of the interruption time during the handover is ensured, thereby ensuring the continuity of the service.

Figure 10:
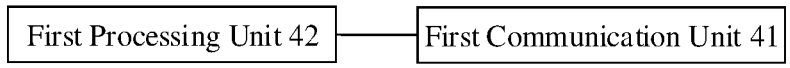
FIG. 10 is a schematic structural diagram of a terminal device according to an embodiment of the present disclosure.

The present embodiment further provides a terminal device, as illustrated in FIG. 10, the terminal device includes a first communication unit 41 and a first processing unit 42.

The first communication unit 41 is configured to receive a handover command.

The first processing unit 42 is configured to perform, based on the handover command, a handover, during performing the handover, based on the first communication unit 41, interaction with a target network device is performed through at least one of a signaling radio bearer (SRB) or a data radio bearer (DRB) between the terminal device and the target network device.

The first processing unit 42 is further configured to perform at least one of: determining whether to release an SRB between the terminal device and a source network device based on an SRB release condition; or determining whether to release a DRB between the terminal device and a source network device based on a DRB release condition.

The first processing unit 42 is configured to: during performing a handover, perform at least one of: determining whether to release an SRB between the terminal device and a source network device based on an SRB release condition; or determining whether to release a DRB between the terminal device and a source network device based on a DRB release condition.

The solution provided by the present embodiment will be described in detail. It should be understood that the present embodiment can be applied to an Enhanced Mobile Broadband (eMBB) and, of course, to other scenarios, except that the present embodiment will not be exhaustive.

The SRB release condition includes at least one of:
- in response to transmission of a signaling MSG1, releasing the SRB between the terminal device and the source network device;
- in response to receipt of a random access response (RAR), releasing the SRB between the terminal device and the source network device;
- in response to transmission of an MSG3 being completed, releasing the SRB between the terminal device and the source network device;
- in response to the handover being completed, releasing the SRB between the terminal device and the source network device; or
- in response to receipt of an MSG4, releasing the SRB between the terminal device and the source network device.

The MSG1, the RAR, the MSG3, and the MSG4 are understood to be information transmitted and received at the time of initiating a random access, and the RAR is an MSG2. The MSG1 refers to an open-loop power control process in which a terminal device gradually boosts a power to transmit probe. The RAR, that is, the MSG2, refers to an ACK returned by the network device side according to the received MSG1 at a certain moment. The MSG3 refers to an RRC setup request or a re-establishment request transmitted by a terminal device. The MSG4 refers to an RRC setup or re-establishment command transmitted by the network device on the network side to the terminal device.

In addition, the DRB release condition includes at least one of:
- in response to transmission of an MSG1, releasing the DRB between the terminal device and the source network device;
- in response to receipt of a random access response (RAR), releasing the DRB between the terminal device and the source network device;
- in response to transmission of an MSG3 being completed, releasing the DRB between the terminal device and the source network device;
- in response to the handover being completed, releasing the DRB between the terminal device and the source network device; or
- in response to receipt of an MSG4, releasing the DRB between the terminal device and the source network device.

Note that the handover command includes configuration information.

The configuration information includes at least one of the SRB release condition or the DRB release condition configured by a network side for the terminal device.

The SRB release condition and the DRB release condition included in the handover command may be at least one of: at least part of the above-described SRB release conditions, that is, one or more of the SRB release conditions, or at least part of the above-described DRB release conditions, that is, one or more of the DRB release conditions.

Further, the SRB release condition and the DRB release condition included in the configuration information in the handover command may be different. For example, the SRB release condition is releasing the SRB between the terminal device and the source network device in response to transmission of an MSG1, and the DRB release condition is releasing the DRB between the terminal device and the source network device in response to the handover being completed. In other words, the times for releasing the SRB and the DRB between the terminal device and the source network device may be different, and of course, may be the same. For example, the SRB and the DRB are both released at the completion of the handover. The time for releasing the SRB and the DRB between the terminal device and the source network device is configured according to the actual situation, and the present embodiment will not be exhaustive.

The condition for performing at least one of establishing the SRB between the terminal device and the target network device or activating the SRB between the terminal device and the target network device, and the condition for performing at least one of establishing the DRB between the terminal device and the target network device or activating the DRB between the terminal device and the target network device will be described as follows.

The first processing unit 42 is further configured to perform at least one of:
- in response to receipt of the handover command, performing at least one of establishing the SRB between the terminal device and the target network device or activating the SRB between the terminal device and the target network device;
- in response to receipt of a random access response (RAR), performing at least one of establishing the SRB between the terminal device and the target network device or activating the SRB between the terminal device and the target network device; or
- in response to transmission of an MSG3, performing at least one of establishing the SRB between the terminal device and the target network device or activating the SRB between the terminal device and the target network device.

The receipt of the handover command may be a moment when the handover command is received, or a period of time after the handover command is received. The receipt of the RAR may be a moment when the RAR is received, or a period of time after the RAR is received. The transmission of the MSG3 may be a moment when the MSG3 is transmitted, or a period of time after the MSG3 is transmitted, or a period of time before the MSG3 is transmitted. The period of time before the MSG3 is transmitted and the period of time after the MSG3 is transmitted may be the same or different, which is set according to actual conditions.

The difference between establishing an SRB and activating an SRB can be understood as follows. Establishing an SRB means that an SRB has been configured for a terminal device by a network, and the terminal device has configuree/established the SRB according to network configuration information, but the SRB has not been activated at this time. Activating the SRB means that the SRB has been established and has been used for signaling interaction between the terminal and the network, i.e. activated. In addition, the differences between establishing a DRB and activating a DRB are similar to those of the SRB, which will not be described later.

For example, the timing or condition for establishing the SRB may be interpreted as establishing the SRB for the target network device upon receipt of the handover command (HO command), or establishing the SRB after the RAR is received.

The timing or condition for activating the SRB may be interpreted as activating the SRB when the terminal device transmits the MSG3, or activating the SRB after the RAR is received.

Of course, the foregoing case is merely an example, and the timing or the condition of establishment and activation may be the same in practice. For example, the SRB and the DRB for the target network device are established upon receipt of the handover command (HO command). This embodiment will not be exhaustive.

The first processing unit 42 is further configured to perform at least one of:
  in response to receipt of the handover command, performing at least one of establishing the DRB between the terminal device and the target network device or activating the DRB between the terminal device and the target network device;
  in response to transmission of an MSG1, performing at least one of establishing the DRB between the terminal device and the target network device or activating the DRB between the terminal device and the target network device;
  in response to receipt of an MSG2, performing at least one of establishing the DRB between the terminal device and the target network device or activating the DRB between the terminal device and the target network device;
  in response to transmission of an MSG3, performing at least one of establishing the DRB between the terminal device and the target network device or activating the DRB between the terminal device and the target network device;
  in response to receipt of an MSG4, performing at least one of establishing the DRB between the terminal device and the target network device or activating the DRB between the terminal device and the target network device; or
  in response to receipt of a physical downlink control channel (PDCCH), performing at least one of establishing the DRB between the terminal device and the target network device or activating the DRB between the terminal device and the target network device.

The receipt of the handover command may be a moment when the handover command is received, or a period of time after the handover command is received. The transmission of the MSG1 may be a moment when the MSG1 is transmitted, or a period of time after the MSG1 is transmitted, or a period of time before the MSG1 is transmitted. The period of time before the MSG1 is transmitted and the period of time after the MSG1 is transmitted may be the same or different, which is set according to actual conditions. The receipt of the MSG2 may be a moment when the RAR is received, or a period of time after the RAR is received. The transmission of the MSG3 may be a moment when the MSG3 is transmitted, or a period of time after the MSG3 is transmitted, or a period of time before the MSG3 is transmitted. The period of time before the MSG3 is transmitted and the period of time after the MSG3 is transmitted may be the same or different, which is set according to actual conditions.

For example, the DRB establishing condition may be establishing the DRB between the terminal device and the target network device upon receipt of the handover command (HO command)

The timing or condition for activating a DRB is one of the following.

Upon transmission of the MSG1, upon receipt of the MSG2, upon transmission of the MSG3, upon receipt of the MSG4; and upon receipt of the PDCCH.

Similarly, the timing or condition for establishing and activating a DRB may be the same or different, which will not be exhaustive here.

It will also be appreciated that the DRB and the SRB between the terminal device and the target network device may be established or activated at different times, or may be established or activated at the same time.

Based on the foregoing solution, the present embodiment further describes in detail how to perform data transmission.

The first processing unit 42 is further configured to perform at least one of the following operations.

When both the DRB between the terminal device and the source network device and the DRB between the terminal device and the target network device are activated, based on the first communication unit 41, data transmission is performed through the DRB between the terminal device and the source network device and the DRB between the terminal device and the target network device. That is, in a case that both the DRB for the source network device and the DRB for the target network device exist, data interaction with the network device side can be performed through both the DRB for the source network device and the DRB for the target network device. In this case, the SRB between the terminal device and the source network device may be in an active state or may have been released; and similarly, the SRB between the terminal device and the target network device may be in an active state or in a released state, which does not affect the interaction with the network device side through the DRB.

When both the SRB between the terminal device and the source network device and the SRB between the terminal device and the target network device are activated, based on the first communication unit 41, data transmission is performed through the SRB between the terminal device and the source network device and the SRB between the terminal device and the target network device. That is, in a case that both the SRB for the source network device and the SRB for the target network device exist, signaling interaction with the network device side is performed through both the SRB for the source network device and the SRB for the target network device. In this case, the DRB between the terminal device and the source network device may be in an active state or may have been released; and similarly, the DRB between the terminal device and the target network device may be in an active state or in a released state, which does not affect the signaling interaction with the network device side through the SRB.

When both the DRB between the terminal device and the source network device and the SRB between the terminal device and the target network device are activated, based on the first communication unit 41, data transmission is performed through the DRB between the terminal device and the source network device and the SRB between the terminal device and the target network device. That is, data interaction is performed with the source network device side through the DRB, and signaling interaction is performed with the target network device through the SRB between the terminal device and the target network device.

When both the SRB between the terminal device and the source network device and the DRB between the terminal device and the target network device are activated, based on the first communication unit 41, data transmission is performed through the SRB between the terminal device and the source network device and the DRB between the terminal device and the target network device. That is, signaling interaction with the source network device side is performed through the SRB, and data interaction with the target network device side is performed through the DRB between the terminal device and the target network device.

The first processing unit 42 is further configured to perform at least one of:
- when the DRB between the terminal device and the source network device is released and the DRB between the terminal device and the target network device is in an active state, based on the first communication unit 41, performing data transmission with the target network device through the DRB;
- when the DRB between the terminal device and the source network device is in an active state and the DRB between the terminal device and the target network device is not activated, based on the first communication unit 41, performing data transmission with the source network device through the DRB;
- when the SRB between the terminal device and the source network device is released and the SRB between the terminal device and the target network device is in an active state, based on the first communication unit 41, performing signaling interaction with the target network device through the SRB; or
- when the SRB between the terminal device and the source network device is in an active state and the SRB between the terminal device and the target network device is not activated, based on the first communication unit 41, performing signaling interaction with the source network device through the SRB.

It should be noted that the foregoing several cases may exist separately or simultaneously. For example, in a case that the SRB for the source network device is in an active state, the SRB for the target network device is not activated, but the DRB between for the source network device is released, and the DRB for the target network device is in an active state, signaling interaction is performed through the SRB between the terminal device and the source network device and the data transmission is performed through the DRB between the terminal device and the target network device. Of course, there may be other cases, which will not be exhaustive here. In general, data and/or signaling interaction is/are performed based on the currently activated SRB and/or DRB of the target network device side, and data and/or signaling interaction is/are performed based on the currently activated SRB and/or DRB of the source network device side.

It should also be noted that the first communication unit 41 is configured to receive a handover command or a system message. The first processing unit 42 is configured to determine at least one of configured SRB between the terminal device and the target network device or configured DRB between the terminal device and the target network device through the handover command or the system message. That is, a bearer to be established may be issued by a handover command, or may be acquired in advance when a system message is received.

Further, regarding the network side, it is also necessary to acquire the capability information of the terminal device, and therefore, it is necessary for the terminal device to transmit the capability of the terminal device. The capability of the terminal device may include the capability information on whether the terminal device is capable of establishing the DRB and/or the SRB with the source network device and the target network device at the same time. Of course, other capabilities may be included, which will not be exhaustive in this embodiment. Accordingly, the network side may perform bearer configuration for the terminal device according to the capability information reported by the terminal device, the bearer configuration including at least one of an SRB configuration between the terminal device and the target network device or a DRB configuration between the terminal device and the target network device, and the like.

Figure 11:
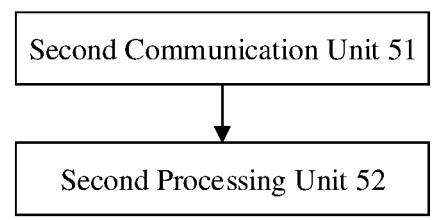
FIG. 11 is a schematic structural diagram of a network device according to an embodiment of the present disclosure.

As illustrated in FIG. 11, the target network device includes a second communication unit 51 configured to interact with the terminal device through at least one of a DRB between the target network device and the terminal device or an SRB between the target network device and the terminal device.

That is, in the foregoing handover procedures, establishment and activation of at least one of the DRB or the SRB can be performed with the terminal device, and finally data and signaling interaction can be performed through at least one of the DRB or the SRB.

Specifically, the time for establishing and activating at least one of the DRB or the SRB between the second communication unit 51 and the terminal device may be the same as those described above, which will not be repeated herein.

Accordingly, the target network device configures at least one of the SRB or the DRB for the terminal device. The target network device further includes a second processing unit 52.

The second processing unit 52 is configured to determine at least one of the SRB or the DRB to be configured for the terminal device based on the capability of the terminal device. The second communication unit 51 is configured to receive capability reported by the terminal device. The manner in which the second communication unit 51 transmits the at least one of configuration of the SRB or configuration of the DRB corresponds to the method performed at the terminal device side. That is to say, the second communication unit 51 may configure at least one of the SRB or the DRB for the terminal device via a handover command or via a system message.

The processing on the source network device side includes forwarding a handover command to the terminal device. The handover command includes configuration information. The configuration information includes at least one of an SRB release condition or a DRB release condition configured by the network side for the terminal device. A specific release condition is described above, which will not be repeated herein.

In addition, the source network device retains at least one of data interaction or signaling interaction with the terminal device before the terminal device releases the at least one of the SRB or DRB between the terminal device and the source device.

It can be seen that by adopting the above-described solution, it is possible to for the terminal device to determine whether to release the SRB and/or the DRB established between the terminal device and the source network device according to the release condition, and at the same time, perform interaction through the SRB and/or the DRB between the terminal device and the target network device during performing a handover, so that the complexity of the terminal device is reduced to the maximum extent while the reduction of the interruption time during the handover is ensured, thereby ensuring the continuity of the service.

Figure 12:
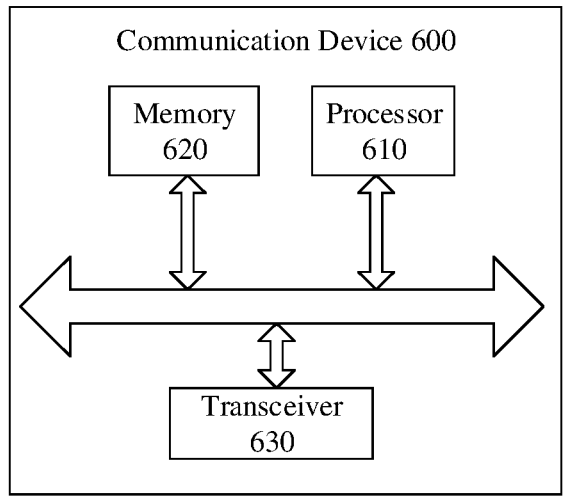
FIG. 12 is a schematic structural diagram of a communication device according to an embodiment of the present disclosure.

FIG. 12 is a schematic structural diagram of a communication device 600 according to an embodiment of the present disclosure. The communication device is a terminal device or a network device according to the embodiment. The communication device 600 illustrated in FIG. 12 includes a processor 610 configured to invoke and run computer programs from a memory to implement the methods in embodiments of the present disclosure.

Alternatively, as illustrated in FIG. 12, the communication device 600 further includes a memory 620. The processor 610 is configured to invoke and run computer programs from the memory 620 to implement the method in the embodiments of the present disclosure.

The memory 620 is a separate device independent of the processor 610, or is integrated in the processor 610.

Alternatively, as illustrated in FIG. 12, the communication device 600 further includes a transceiver 630 that may be controlled by the processor 610 to communicate with other devices, specifically, to transmit information or data to other devices or receive information or data transmitted by other devices.

The transceiver 630 includes a transmitter and a receiver. The transceiver 630 further includes antennas, and the number of the antennas may be one or more.

Alternatively, the communication device 600 may be specifically a network device according to an embodiment of the present disclosure, and the communication device 600 may implement corresponding procedures implemented by the network device in each method according to the embodiment of the present disclosure. For brevity, details are not described herein.

Alternatively, the communication device 600 may be specifically a terminal device or a network device according to an embodiment of the present disclosure, and the communication device 600 may implement corresponding procedures implemented by a mobile terminal/terminal device in each method in the embodiment of the present disclosure. For brevity, details are not described herein.

Figure 13:
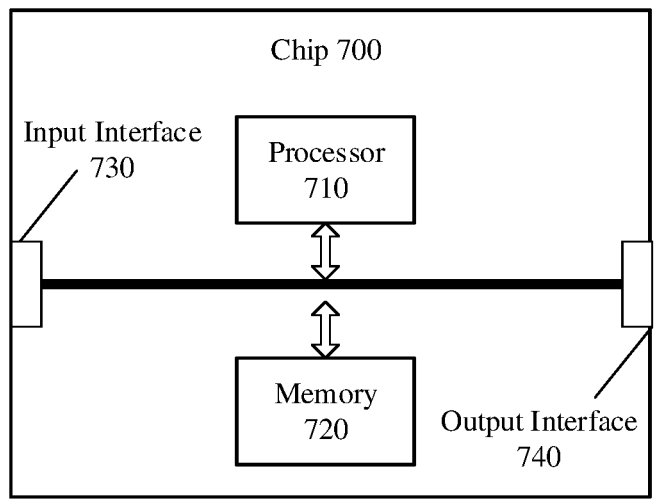
FIG. 13 is a schematic block diagram of a chip according to an embodiment of the present disclosure.

FIG. 13 is a schematic structural diagram of a chip according to an embodiment of the present disclosure. The chip 700 illustrated in FIG. 13 includes a processor 710 configured to invoke and run computer programs from memory to implement the methods according to the embodiments of the present disclosure.

Alternatively, as illustrated in FIG. 13, the chip 700 further includes a memory 720. The processor 710 is configured to invoke and run computer programs from the memory 720 to implement the method in the embodiments of the present disclosure.

The memory 720 is a separate device independent of the processor 710, or is integrated in the processor 710.

Alternatively, the chip 700 further includes an input interface 730. The processor 710 controls the input interface 730 to communicate with other devices or chips, and specifically, may acquire information or data transmitted by other devices or chips.

Alternatively, the chip 700 further includes an output interface 740. The processor 710 controls the output interface 740 to communicate with other devices or chips, and specifically outputs information or data to other devices or chips.

Alternatively, the chip is applied to the network device in the embodiment of the present disclosure, and the chip implements corresponding procedures implemented by the network device in the various methods in the embodiment of the present disclosure. For brevity, details are not described herein.

Alternatively, the chip is applied to the terminal device in the embodiment of the present disclosure, and the chip implements corresponding procedures implemented by the terminal device in each method in the embodiment of the present disclosure. For brevity, details are not described herein.

It should be understood that the chips mentioned in the embodiments of the present disclosure may also be referred to as system-level chips, system chips, chip systems or system-on-chip chips.

Figure 14:
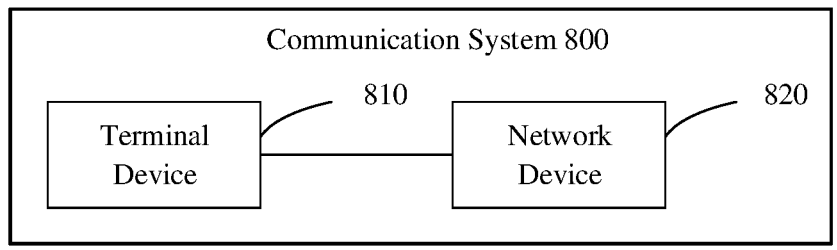
FIG. 14 is a second schematic diagram of a communication system architecture according to an embodiment of the present disclosure.

FIG. 14 is a schematic block diagram of a communication system 800 according to an embodiment of the present disclosure. As illustrated in FIG. 14, the communication system 800 includes a terminal device 810 and a network device 820.

Here, the terminal device 810 may be used to implement the corresponding functions implemented by the terminal device in the above method, and the network device 820 may be used to implement the corresponding functions implemented by the network device in the above method. For brevity, details are not described herein.

It should be understood that the processor of the embodiment of the disclosure may be an integrated circuit chip with signal processing capability. In the implementation process, the operations of the foregoing method embodiments may be completed by indications in the form of software or the integrated logic circuits of the hardware in the processor. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, operations, and logical block diagrams disclosed in the embodiments of the disclosure may be implemented or executed. The general-purpose processor may be a microprocessor or the processor may further be any conventional processor or the like. The operations of the method disclosed in the embodiments of the disclosure may be directly embodied as being executed and completed by a hardware decoding processor, or executed and completed by a combination of hardware and software modules in the decoding processor. The software module may be located in a mature storage medium in the field such as a random access memory, a flash memory, a read-only memory, a programmable read-only memory, or an electrically erasable programmable memory or a register. The storage medium is located in the memory, and the processor reads the information in the memory and completes the operations of the above-mentioned method in combination with its hardware.

It can be understood that the memory in the embodiment of the disclosure may be a volatile memory or a non-volatile memory, or may include both volatile and non-volatile memory. Among them, the non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of exemplary but not restrictive description, many forms of RAM are available, such as static RAMs (SRAM), dynamic RAMs (DRAM), synchronous DRAMs (SDRAM), double data rate SDRAMs (DDR SDRAM), enhanced SDRAMs (ESDRAM), synchlink DRAMs (SLDRAM)) and direct rambus RAMs (DR RAM). It should be noted that the memories of the systems and methods described herein are intended to include, but are not limited to these and any other suitable types of memory.

It should be understood that the foregoing memory is exemplary but not restrictive. For example, the memory in the embodiment of the disclosure may further be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) or a direct rambus RAM (DR RAM), etc. That is to say, the memory in the embodiments of the disclosure is intended to include but is not limited to these and any other suitable types of memory.

The embodiment of the disclosure further provides a computer-readable storage medium for storing computer programs.

In an embodiment, the computer-readable storage medium may be applied to the network device in the embodiment of the disclosure, and computer programs cause the computer to execute the corresponding procedures implemented by the network device in each method of the embodiment of the disclosure. For the sake of brevity, details are not repeated here.

In an embodiment, the computer-readable storage medium may be applied to the mobile terminal/terminal device in the embodiments of the disclosure, and the computer programs cause the computer to execute the corresponding procedures implemented by the mobile terminal/terminal device in each method of the embodiment of the disclosure. For the sake of brevity, details are not repeated here.

The embodiment of the disclosure further provides computer program product, including computer program instructions.

In an embodiment, the computer program product may be applied to the network device in the embodiment of the disclosure, and the computer program instructions cause the computer to execute the corresponding procedures implemented by the network device in each method of the embodiment of the disclosure. For the sake of brevity, details are not repeated here.

In an embodiment, the computer program product may be applied to the mobile terminal/terminal device in the embodiments of the disclosure, and the computer program instructions cause the computer to execute the corresponding procedures implemented by the mobile terminal/terminal device in each method of the embodiment of the disclosure. For the sake of brevity, details are not repeated here.

The embodiment of the disclosure further provides a computer program.

In an embodiment, the computer program may be applied to the network device in the embodiment of the disclosure. When the computer program runs on the computer, the computer is caused to execute the corresponding procedures implemented by the network device in each method of the embodiment of the disclosure. For the sake of brevity, details are not repeated here.

In an embodiment, the computer program may be applied to the mobile terminal/terminal device in the embodiment of the disclosure. When the computer program runs on the computer, the computer can execute the corresponding procedures implemented by the mobile terminal/terminal device in each method of the embodiment of the disclosure. For the sake of brevity, details are not repeated here.

By adopting the above-described solution, it is possible to for the terminal device to determine whether to release the SRB and/or the DRB established between the terminal device and the source network device according to the release condition, and at the same time, perform interaction through the SRB and/or the DRB between the terminal device and the target network device during performing a handover, so that the complexity of the terminal device is reduced to the maximum extent while the reduction of the interruption time during the handover is ensured, thereby ensuring the continuity of the service.

A person of ordinary skilled in the art may be aware that the units and algorithm operations of the examples described in the embodiments disclosed herein may be implemented by electronic hardware or a combination of computer software and electronic hardware. Whether these functions are executed by hardware or software depends on the specific application and design constraints of the technical solution. Professionals and technicians can use different methods to implement the described functions of each specific application, but such implementation should not be considered beyond the scope of the disclosure.

Those skilled in the art may clearly understand that, for the convenience and conciseness of the description, the specific working process of the above-described system, apparatus and unit may refer to the corresponding procedures in the foregoing method embodiments, which will not be repeated here.

In the several embodiments provided by the disclosure, it should be understood that the disclosed system, apparatus and method may be implemented in other ways. For example, the apparatus embodiments described above are only illustrative. For example, the division of the units is only a logical function division, and there may be other divisions in actual implementation. For example, multiple units or components may be combined or integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the present embodiments.

In addition, the functional units in each embodiment of the disclosure may be integrated into one processing unit, or each unit may exist separately and physically, or two or more units may be integrated into one unit.

If the function is implemented in the form of a software functional unit and is sold or used as an independent product, it can be stored in a computer readable storage medium. Based on such an understanding, the technical solution of the disclosure or the part that contributes to the related art or the part of the technical solution may be embodied in the form of a software product essentially, and the computer software product is stored in a storage medium including several indications to make a computer device (which may be a personal computer, a server or a network device, etc.) execute all or part of the operations of the methods described in the each embodiment of the disclosure. The aforementioned storage medium includes: U disks, mobile hard disks, read-only memories (ROM), random access memories (RAM), magnetic disks or optical disks and other media that can store program codes.

The foregoing is only the specific implementation mode of the disclosure. However, the protection scope of the disclosure is not limited thereto. Any variations or replacements apparent to those skilled in the art within the technical scope disclosed by the present disclosure shall fall within the protection scope of the present disclosure. Therefore, the protection scope of the disclosure shall be subject to the protection scope of the claims.

The invention claimed is:

1. A handover processing method, performed by a terminal device, comprising:
   receiving a handover command, wherein the handover command comprises configuration information that comprises a signaling radio bearer (SRB) release condition and a data radio bearer (DRB) release condition configured for the terminal device, the SRB release condition comprising: in response to a handover being completed, releasing a SRB between the terminal device and a source network device, and the DRB release condition comprising: in response to the handover command being received, releasing a DRB between the terminal device and the source network device;
   establishing, in response to the handover command being received, a SRB between the terminal device and a target network device and a DRB between the terminal device and the target network device, releasing the DRB between the terminal device and the source network device according to the DRB release condition, and retaining the SRB between the terminal device and the source network device;
   performing, based on the handover command, the handover; and
   releasing, according to the SRB release condition, the SRB between the terminal device and the source network device after the handover is completed.

2. The method of claim 1, further comprising: transmitting capability of the terminal device, wherein the capability of the terminal device comprises capability information on whether the terminal device is capable of establishing at least one of the DRB or the SRB with the source network device and the target network device at the same time.

3. A terminal device, comprising:
   a processor;
   a memory for storing computer programs; and
   a transceiver, wherein
   the transceiver is configured to receive a handover command, wherein the handover command comprises configuration information that comprises a signaling radio bearer (SRB) release condition and a data radio bearer (DRB) release condition configured for the terminal device, the SRB release condition comprising: in response to a handover being completed, releasing a SRB between the terminal device and a source network device, and the DRB release condition comprising: in response to the handover command being received, releasing a DRB between the terminal device and the source network device; and
   the processor is configured to execute the computer programs to:
   establish, in response to the handover command being received, a SRB between the terminal device and a target network device and a DRB between the terminal device and the target network device, release the DRB between the terminal device and the source network device according to the DRB release condition, and retain the SRB between the terminal device and the source network device;
   perform, based on the handover command, the handover; and
   release the SRB between the terminal device and the source network device after the handover is completed according to the SRB release condition.

4. The terminal device of claim 3, wherein the transceiver is configured to further receive the handover command or a system message; and
   the processor is further configured to execute the computer programs to determine, via the handover command or via the system message, at least one of configured SRB between the terminal device and the target network device or configured DRB between the terminal device and the target network device.

5. A target network device, comprising:
   a processor;
   a memory for storing computer programs; and
   a transceiver,
   wherein the processor is configured to execute the computer programs to interact with a terminal device through a data radio bearer (DRB) between the target network device and the terminal device and a signaling radio bearer (SRB) between the target network device and the terminal device via the transceiver,
   wherein the DRB between the target network device and the terminal device and the SRB between the target network device and the terminal device are established by the terminal device in response to a handover command being received, the handover command comprising configuration information that comprises a SRB release condition and a DRB release condition configured for the terminal device, the SRB release condition comprising: in response to a handover being completed, releasing a SRB between the terminal device and a source network device, and the DRB release condition comprising: in response to the handover command being received, releasing a DRB between the terminal device and the source network device; and
   wherein in response to the handover command being received, the DRB between the terminal device and the source network device is released according to the DRB release condition after the SRB between the terminal device and the target network device and the DRB between the terminal device and the target network device are established and before a handover to the target network device is performed, and the SRB between the terminal device and the source network device is released according to the SRB release condition after the handover is completed.

6. The target network device of claim 5, wherein the processor is further configured to execute the computer programs to configure, via a handover command or via a system message, at least one of the SRB or the DRB for the terminal device.

7. The target network device of claim 6, wherein the processor is further configured to execute the computer programs to determine, based on capability of the terminal device, at least one of the SRB or the DRB configured for the terminal device, wherein the transceiver is further configured to receive the capability of the terminal device, and wherein the capability of the terminal device comprises capability information on whether the terminal device is capable of establishing at least one of the DRB or the SRB with the source network device and the target network device at the same time.

* * * * *